United States Patent [19]
Spykerman et al.

[11] Patent Number: 5,562,331
[45] Date of Patent: Oct. 8, 1996

[54] STORAGE COMPARTMENT WITH COVER

[75] Inventors: David J. Spykerman, Zeeland; Kim L. Van Order, Hamilton; Jerry M. DeJong, West Olive, all of Mich.

[73] Assignee: Prince Corporation, Holland, Mich.

[21] Appl. No.: 353,135

[22] Filed: Dec. 9, 1994

[51] Int. Cl.⁶ ........................................ A47C 7/62
[52] U.S. Cl. .................. 297/188.16; 297/188.19; 297/DIG. 6
[58] Field of Search ............... 297/188.14, 188.15, 297/188.16, 188.19, 188.21, 188.18, 188.01, DIG. 6, 188.1, 188.08, 188.09, 113, 115, 129, 94, 104; 248/311.2; 224/275

[56] References Cited

U.S. PATENT DOCUMENTS

| | | | |
|---|---|---|---|
| 849,423 | 4/1907 | Ort | 297/283.1 X |
| 912,781 | 2/1909 | Barrett et al. | 297/283.1 |
| 2,554,685 | 5/1951 | Denis . | |
| 2,719,066 | 9/1955 | Budzinski . | |
| 2,797,739 | 7/1957 | Orsini . | |
| 2,914,164 | 11/1959 | Gingerich et al. . | |
| 3,083,998 | 4/1963 | Morris . | |
| 3,114,574 | 12/1963 | Pryale | 297/188.1 X |
| 3,132,892 | 5/1964 | Stevens . | |
| 3,177,033 | 4/1965 | Daniels . | |
| 3,356,409 | 12/1967 | Belsky et al. . | |
| 3,880,485 | 4/1975 | Schmelzer . | |
| 3,951,448 | 4/1976 | Hawie | 297/188.19 X |
| 4,040,659 | 8/1977 | Arnold . | |
| 4,417,764 | 11/1983 | Marcus et al. . | |
| 4,568,117 | 2/1986 | McElfish et al. . | |
| 4,756,572 | 7/1988 | Dykstra et al. . | |
| 4,783,037 | 11/1988 | Flowerday . | |
| 4,818,017 | 4/1989 | Dykstra et al. . | |
| 4,889,257 | 12/1989 | Steffes . | |
| 4,928,865 | 5/1990 | Lorence et al. | 297/188.16 X |
| 4,958,576 | 9/1990 | Kauer . | |
| 5,018,633 | 5/1991 | Toth et al. . | |
| 5,076,641 | 12/1991 | Lindberg | 297/188.19 |
| 5,195,711 | 3/1993 | Miller et al. . | |
| 5,248,183 | 9/1993 | Gignac et al. . | |
| 5,316,368 | 5/1994 | Arbisi . | |
| 5,322,021 | 7/1994 | Jackson . | |
| 5,390,976 | 2/1995 | Doughty et al. | 297/188.19 X |

FOREIGN PATENT DOCUMENTS

| | | |
|---|---|---|
| 0219632 | 8/1986 | European Pat. Off. . |
| 3276832 | 9/1991 | Japan . |
| 2054480 | 2/1981 | United Kingdom . |

*Primary Examiner*—Milton Nelson, Jr.
*Attorney, Agent, or Firm*—Price, Heneveld, Cooper, DeWitt & Litton

[57] ABSTRACT

A storage component such as an armrest includes a base defining a compartment, and a cover for closing the compartment. A pair of spaced apart links operably connect the cover to the base for movement between a first closed position where an aesthetic side of the cover is exposed for supporting a person's arm, a second raised position for inverting the cover, and a third inverted and closed position where a cupholder-defining side of the cover is exposed for holding containers. In some embodiments, a pair of panels are pivotally attached to one of the base and the cover for movement between a storage position in the compartment and a laterally extending position for supporting loose items thereon.

27 Claims, 5 Drawing Sheets

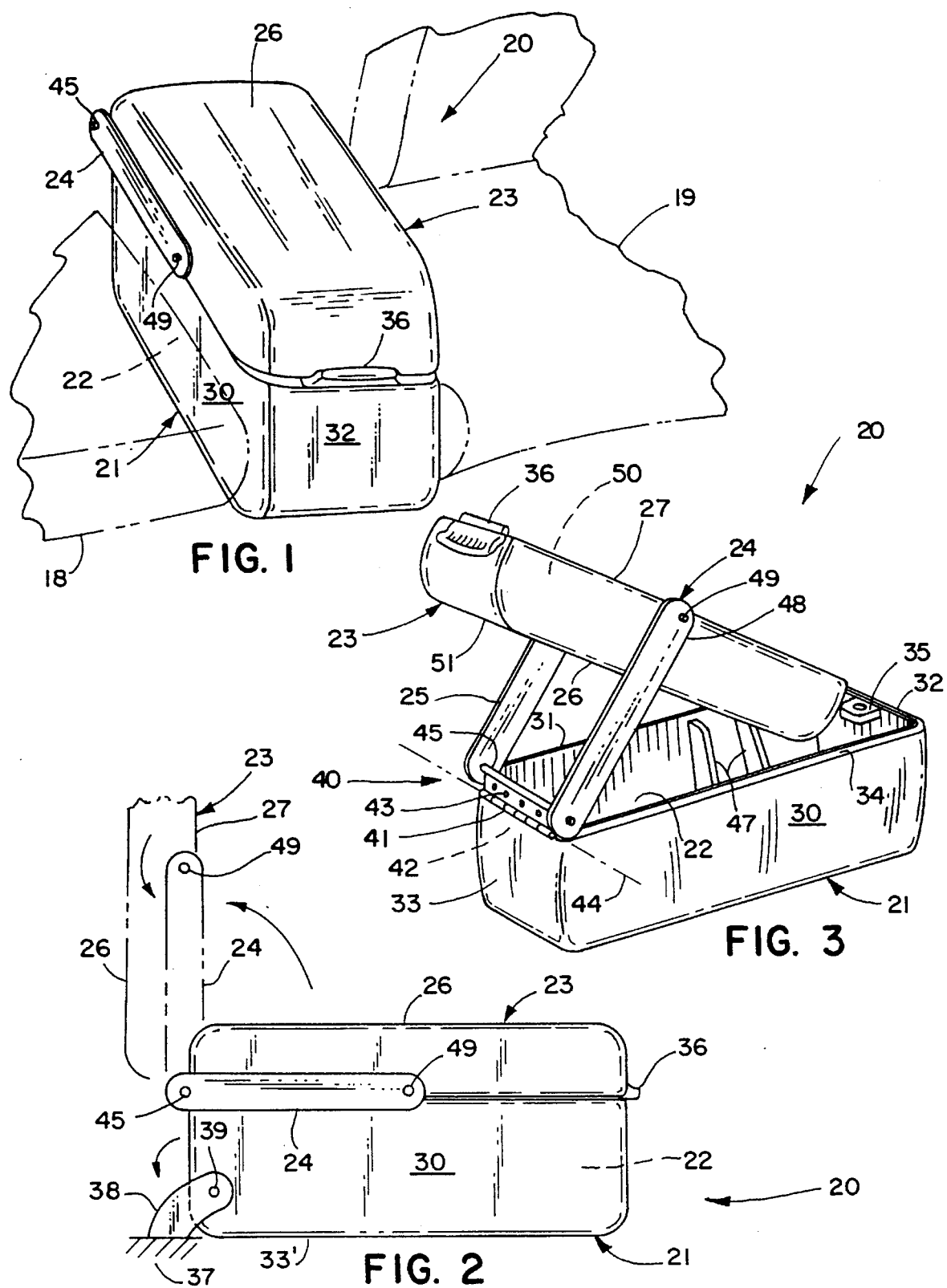

STORAGE COMPARTMENT WITH COVER

BACKGROUND OF THE INVENTION

The present invention relates to storage compartments, and more particularly a vehicle armrest having a novel cover for both closing a compartment in the armrest and for providing functional features on the armrest, although the invention is not limited to only armrests.

Consoles and/or armrests positioned between the driver and passenger seats of the vehicles are in a highly accessible and central position in the vehicles, and for this reason are often constructed to include various functional structures such as cupholders' trays, depressions, and the like. However, the functional structures tend to be unsightly and detract from the aesthetic decor of a vehicle passenger compartment. Thus, it is desirable to mount the functional structures on pivot/slide mechanisms for movement so that they can be moved to hidden positions to preserve and maintain the appearance of the vehicle interior when the functional structures are not in use. However, many pivot/slide mechanisms are undesirably complex and add excessive cost to the manufacturing and assembly processes. Further, many pivot/slide mechanisms are not durable, and add undesirably to warranty expense and maintenance problems. Still further, in order to fit into the console/armrest, the functional structures must necessarily be smaller than the console/armrest, which makes it difficult to provide a functional structure of significant size while still maintaining a simple device that is easy to build, low cost and maintenance free.

There exist a variety of armrests and the like for vehicles having storable cupholders that can be moved from a storage position in the armrests to an extended position for use, usually in front of or above the armrest. For example, see U.S. Pat. Nos. 5,195,711, 4,756,572 and 4,818,017. However, often there is insufficient space in front of the armrest to receive a cupholder. Further, beverage spilled from a cupholder positioned in front of or above the armrest can be difficult to clean up since there is usually no "catch tray" around the base of the cupholder, particularly for fabric covered armrests. Additionally, there is a continuing need for novel cupholder structures that match the interior design and style of vehicle passenger compartments and further that satisfy the plurality of functional and spacial requirements set by the manufacturer. At the same time, the cupholder structures must be durable, low maintenance, easily operated, easily cleaned, and low cost.

Aside from cupholders, most known armrests include a cushioned upper surface covered with fabric or vinyl sheet material for aesthetics, and thus do not provide a secure flat easily cleanable surface for holding non-beverage food items such as sandwiches. Some armrests provide a storable tray that can be extended to temporarily support items thereon. For example, see U.S. Pat. No. 4,417,764. However, improvements are desired to provide a relatively large surface in a more convenient location, while still providing the aesthetics and comfort of a cushioned covered armrest. Thus, vehicle storage compartments solving the aforementioned problems are desired.

SUMMARY OF THE INVENTION

In one aspect, the system of the present invention includes an armrest for a vehicle having a base configured for connection to the vehicle, the base defining an upper surface, and a cover shaped to overlay the upper surface. The cover has a first side for comfortably supporting a person's arm and a second side defining a depression. A pair of spaced links operably connect the cover to the base for movement between an armrest-defining position where the first side is exposed for use, a raised position where the cover can be inverted relative to the base, and an inverted use position where the depression on the second side is exposed for use. In a preferred form, the second side includes a plurality of depressions and surfaces defining a cupholder and sub-compartments for holding other items.

In another aspect, the system of the present invention includes an article for vehicles having an elongated base configured for connection to a vehicle between a pair of seats in the vehicle. The base includes sidewalls and front and rear end walls defining a compartment and an opening to the compartment. A cover is shaped to mateably engage the walls to close the opening and is pivotally connected to the base for movement between a closed position and an open position for accessing the compartment. A panel is movably connected to one of the base and the cover, the panel being operably supported for movement between a storage position wherein the panel is located in the compartment and a use position wherein the panel extends laterally from one of the sidewalls. The panel includes a relatively flat surface configured to support items adjacent the one sidewall over an edge of one of the seats. Preferably, the panel is positioned at an angle when in the use position so that items placed thereon tend to nest against the side of the cover in a stably supported position on the panel.

These and to other features, advantages and objects of the present invention will be further understood and appreciated by those skilled in the art by reference to the following specification, claims and appended drawings.

BRIEF DESCRIPTION OF THE DRAWINGS

FIG. 1 is a fragmentary perspective view of an armrest embodying the present invention, the cover of the armrest being shown in the closed position;

FIG. 2 is a side view of the armrest shown in FIG. 1, the cover being shown in the closed position in solid lines and in the open position in phantom lines;

FIG. 3 is a perspective view of the armrest shown in FIG. 1, the cover being shown in a raised and inverted position;

DETAILED DESCRIPTION OF PREFERRED EMBODIMENTS

Figure 4:
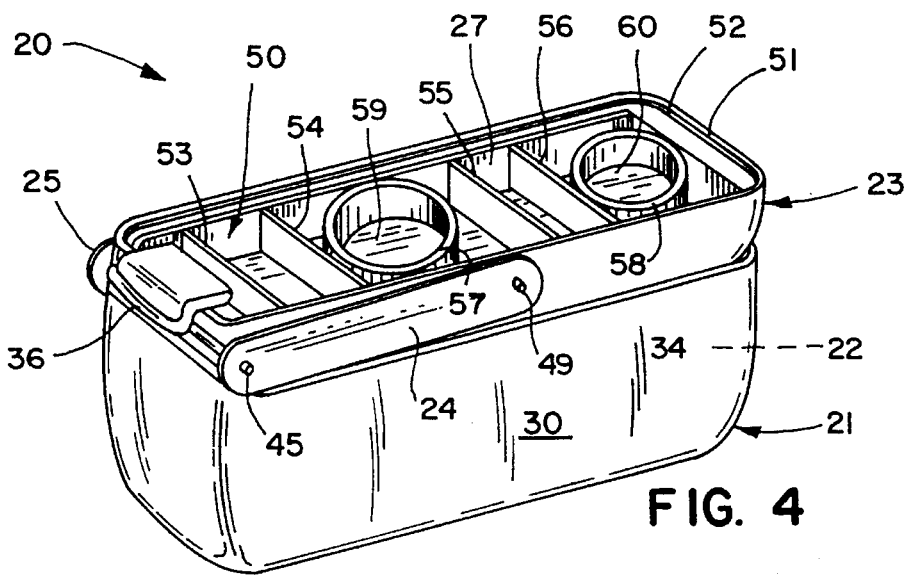
FIG. 4 is a perspective view of the armrest shown in FIG. 1, the cover being shown in a closed and inverted position.
Figure 5:
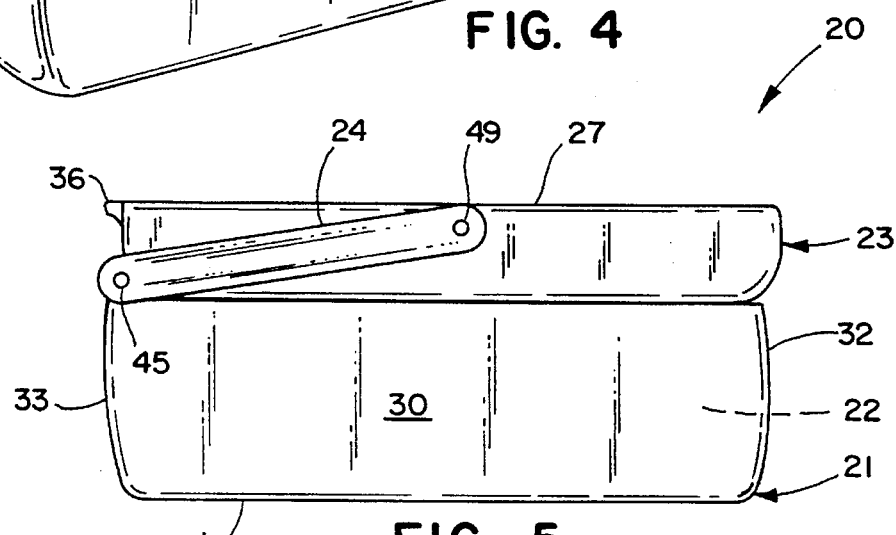
FIG. 5 is a side view of the armrest shown in FIG. 4.

FIG. 1 shows an armrest 20 embodying the present invention. Armrest 20 includes a base 21 defining a compartment 22 located between vehicle seats 18 and 19, and a cover 23 for closing the compartment 22. A linkage including a pair of spaced links 24 and 25 operably connects the cover 23 to the base 21 for movement between a first position (FIG. 1) where an aesthetic cushioned side 26 of the cover 23 is exposed for supporting a person's arm, a raised position (FIG. 3) for inverting the cover 23, and a closed inverted position (FIG. 4) where a cupholder-defining side 27 of cover 23 is exposed for holding containers. Notably, the entire surface area of cupholder-defining side 27 is subdivided for use in the illustrated cover 23, although alternative configurations such as a flat writing tray of the like are also contemplated.

Base 21 (FIG. 3) includes sidewalls 30 and 31, end walls 32 and 33 and a floor 33' that define compartment 22. The upper edge 34 of walls 30–33 defines an access opening to compartment 22. A catch 35 is located on the inside of front wall 32, and a latch 36 is located on the front end of cover 23 for releasably engaging catch 35. Base 21 is pivotally secured to a vehicle 37 (FIG. 2) by a hinge bracket 38 and pivot pin 39.

Linkage 40 (FIG. 3) includes links 24 and 25 and further includes a transverse hinge 41 that operably connects links 24 and 25 to the rear end wall 33 of base 21. Hinge 41 includes a stationary hinge half 42 secured to base wall 33, and further includes a movable hinge half 43 pivotally secured to stationary hinge half 42 by a pivot pin (not specifically shown) to define a first axis of rotation 44. Movable hinge half 43 is fixedly secured to links 24 and 25 at the "rear" end of links 24 and 25 to create a stable U-shaped mechanical linkage for stably supporting cover 23. A reinforcement rod 45 is extended along the top of movable hinge half 43 for rigidifying the U-shaped linkage. Alternatively, it is noted that the axis (44) could be located at rod 45 by making links 24 and 25 rotatably engage rod 45. Additional structure can be located in compartment 22 as desired, such as ribs 47 which are adapted to receive a coin holder (not shown).

Links 24 and 25 comprise stamped strips of steel. The "from" end 48 of strips 24 (and 25) are pivotally secured to cover 23 by a pivot rod 49 which extends transversely through cover 23. The ends of pivot rod 49 are peened over or blunted or otherwise capped for safety.

Cover 23 (FIG. 3) includes a molded piece 50 made from molded polypropylene or the like that provides structure for cover 23. A foam pad or cushion (not specifically shown) is placed on side 26, and a sheet of aesthetic trim material 51 such as fabric, vinyl or leather is placed on the foam pad and wrapped around onto molded piece 50. The edges of sheet 51 are attached to the inside of perimeter flange 52 on side 27 (FIG. 4). A plurality of walls including subdividing walls 53–56 and arcuate walls 57 and 58 are formed inside 27 of molded piece 50. Arcuate walls 57 and 58 define container holder apertures 59 and 60, respectively, and further define depressions for mateably receiving and stably supporting a soda can or beverage container therein. In the inverted position (FIG. 4), cover 23 engages the upper edges 34 of walls 30–31 to provide a stable arrangement for cover 23. Thus, cover 23 closes the access opening to compartment 22 when in the armrest-defining position (FIG. 1) and when in the cupholder-defining position (FIG. 4).

Additional armrests embodying the present invention are also disclosed below. To reduce redundant discussion, comparable or identical components and features in the additional embodiments are identified with identical numbers but with the addition of the letters "A," "B" and "C."

Figure 7:
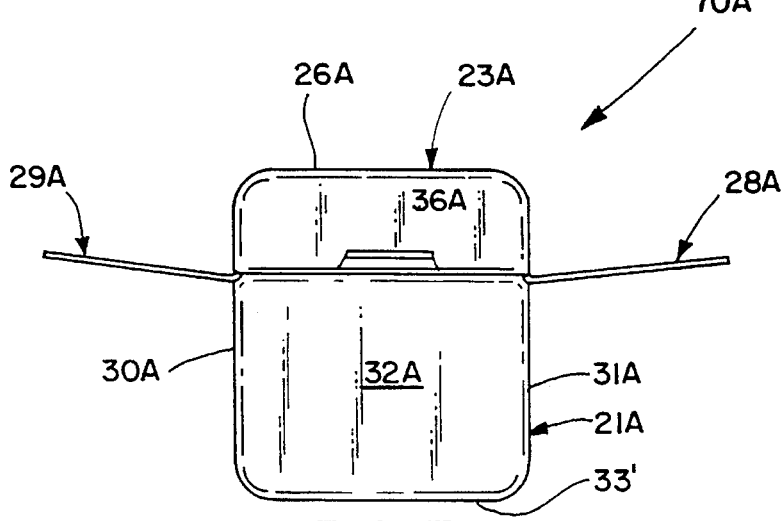
FIG. 7 is an end view of the armrest shown in FIG. 6, the cover being shown in the closed position and both panels being shown in the extended positions.
Figure 6:
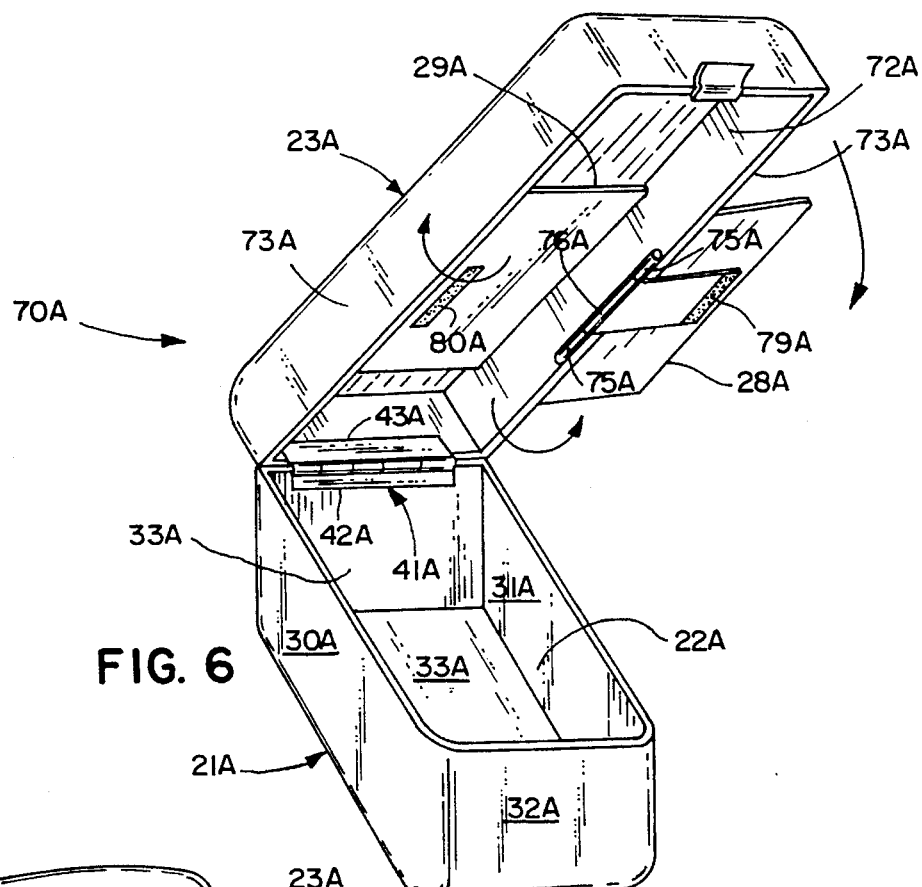
FIG. 6 is a perspective view of another embodiment of the present invention, the cover of the armrest being shown in an open position, one of the panels being shown in a laterally extended position and the other of the panels being shown in a storage position.
Figure 8:
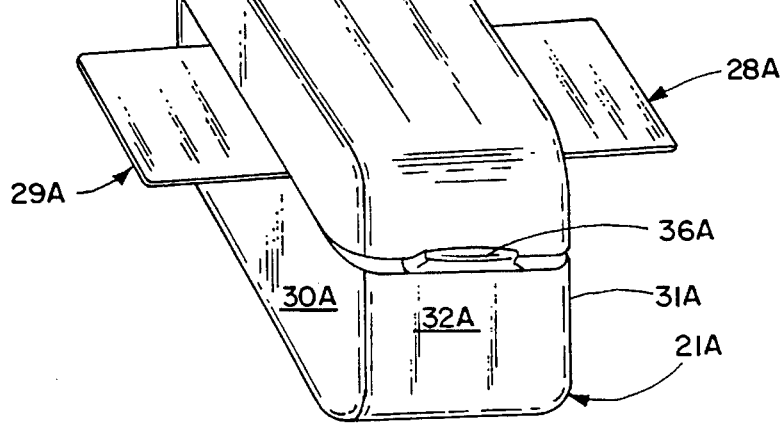
FIG. 8 is a perspective view of the armrest shown in FIG. 7.

Armrest 70A (FIG. 6) includes a base 21A defining a compartment 22A therein, and a cover 23A pivotally secured to base 21A for closing the compartment 22A. A hinge 41A includes a stationary hinge half 42A secured to base wall 33A, and further includes a movable hinge half 43A pivotally secured to stationary hinge half 42A by a pivot pin (not shown). Movable hinge half 43A is secured to the rear of cover 23A so that cover 23A opens with a rearward pivoting motion from base 21A. Cover 23A defines a recess 72A on its underside. A pair of pivot-forming protrusions 75A are formed along each of the sidewalls 73A of cover 23A, and a pair of panels 28A and 29A are pivotally attached to structures 75A under cover 23A. Specifically, each panel 28A and 29A includes a protrusion 76A at its inner end. Protrusion 76A is configured to fit mateably between the pair of protrusions 75A. Protrusions 75A and 76A include holes that align for receiving a pivot pin (not specifically shown). Thus, panels 28A and 29A are movable between a storage position located under cover 23A (see panel 29A) an extended position wherein they extend laterally from cover 23A (see panel 28A). Notably, by offsetting the protrusion 76A from the flat planar section 77A of panels 28A (and 29A), the panels 28A (and 29A) are recessed into the recess 72A on the underside of cover 23A when in the storage position. Panel 28A includes a strip of hook-and-loop material 79A for releasably engaging a mating strip of hook-and-loop material 80A on panel 29A when panels 28A and 29A are in the storage position. Panel 29A is hingedly connected to cover 23A in a manner comparable to panel 28A. When cover 23A is closed on base 21A and latch 36A engages catch 35A, panels 28A and 29A extend laterally from the sides of armrest 70A (FIG. 7). This allows a note pad to be placed on panel 28A or on panel 29A for writing thereon, or alternatively provides a shelf-like surface for supporting food or the like. Notably, panels 28A and 29A extend laterally from the sides of armrest 20A so that they overhand an edge of the adjacent vehicle seat over a person's thigh. Thus, panels 28A and 29A efficiently utilize the space around armrest 20A. Also, panels 28A and 29A, when in the extended position, extend at an acute angle so that their upper surface slants slightly toward cover 23A. Thus, items placed thereon nest against the side of cover 23A in a stable, secure position.

Figure 9:
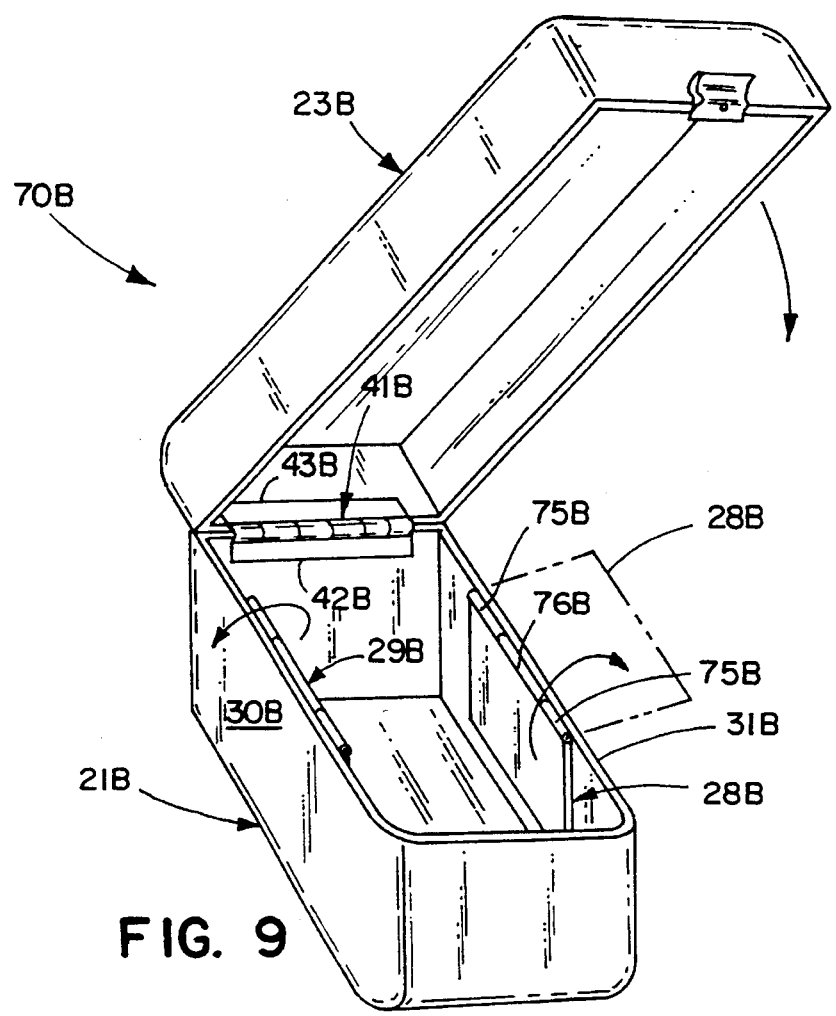
FIG. 9 is a perspective view of another embodiment of the present invention, the cover of the armrest being shown in the open position and the panels being shown in a storage position within the base.

Armrest 70B (FIG. 9) illustrates an armrest having a base 21B and cover 23B substantially identical to armrest 70A, but with the panels 28B and 29B being pivotally attached to base sidewalls 30B and 31B for pivotal movement in and out of compartment 22B. The parts of protrusions 75B are formed on the inside of sidewalls 30B and 31B, and panels 28B and 29B are configured to mateably pivot into compartment 22B adjacent sidewalls 30B and 31B for storage.

Figure 10:
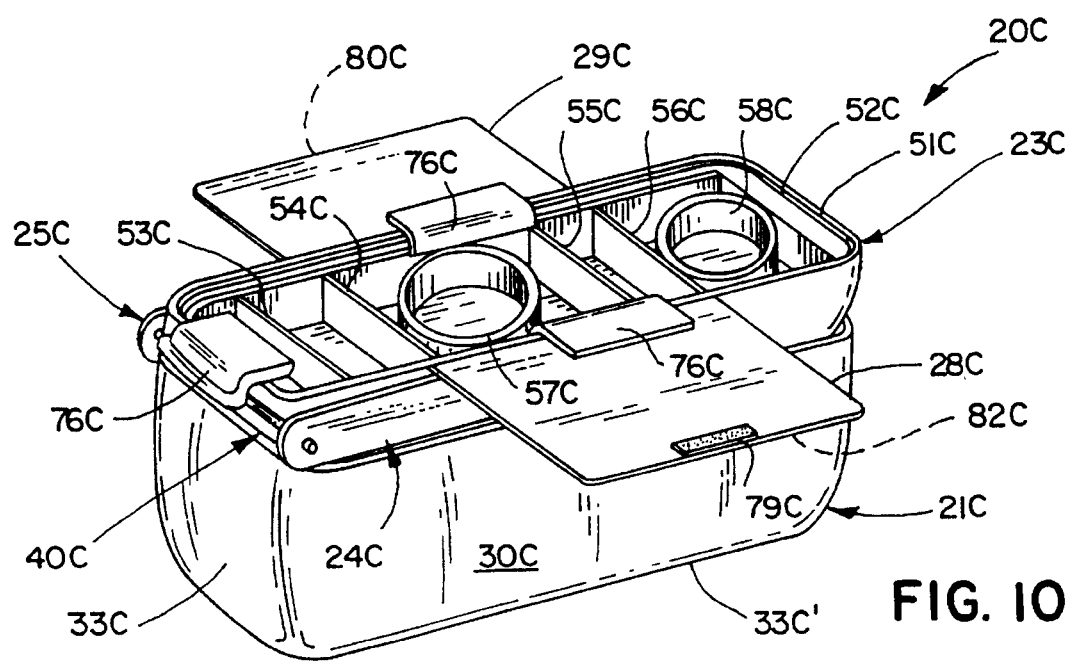
FIG. 10 is a perspective view of another embodiment of the present invention that incorporates both an invertible cover and a pair of pivot-out panels.
Figure 11:
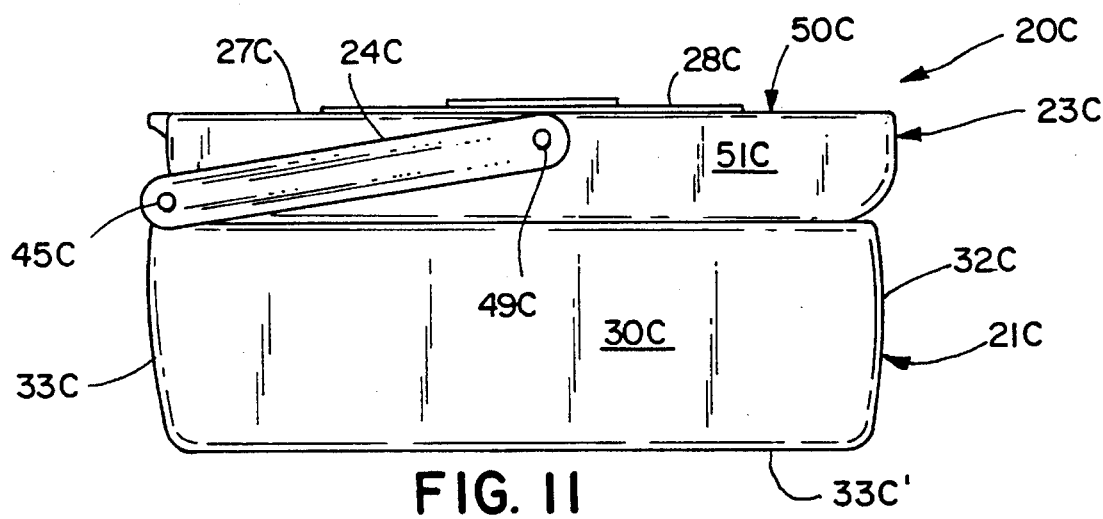
FIG. 11 is a side view of the armrest shown in FIG. 10.
Figure 12:
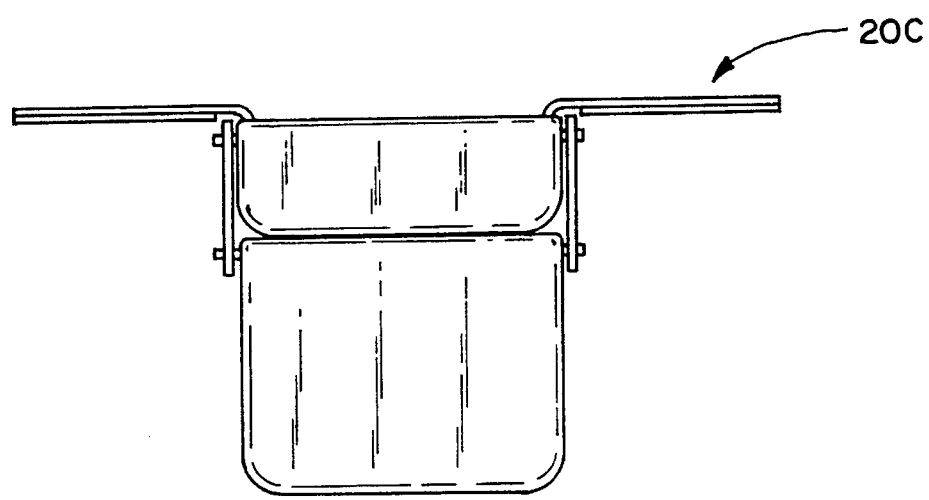
FIG. 12 is an end view of the armrest shown in FIG. 10.
Figure 13:
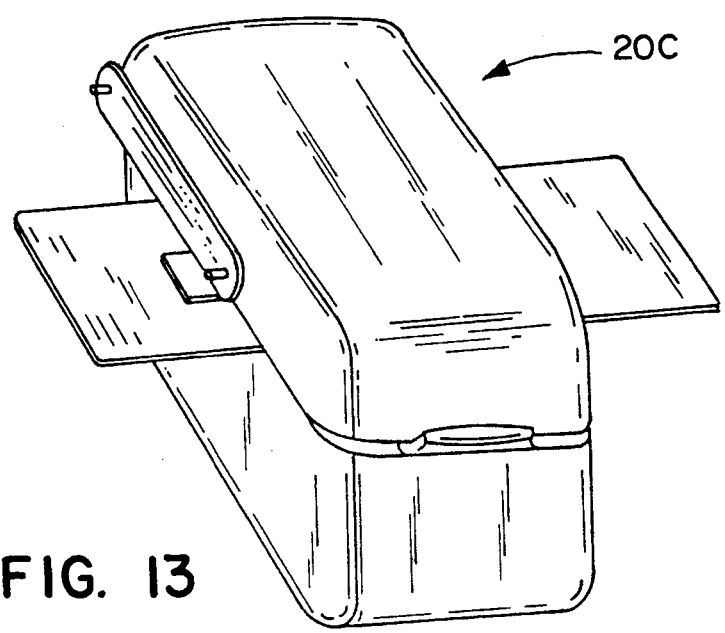
FIG. 13 is a perspective view of the armrest shown in FIG. 10, the cover being in the armrest-defining and closed position, the pair of panels being shown in the extended use position.

An armrest 20C (FIGS. 10–13) defines an armrest having a base 21C and cover 23C pivotally interconnected by linkage 40C including links 24C and 25C. In armrest 20C, panels 28C and 29C are pivotally secured to the underside of cover 23C. Panels 28C and 29C fold onto the tops of subdividing walls 53C–58C when moved to the storage position. Notably, panels 28C can be extended when cover 23C is in either the inverted and closed position (FIG. 10) or when cover 23C is in the armrest-defining closed position (FIG. 13). Mating patches of hook-and-loop material 79A and 80A (FIG. 10) hold panels 28C and 29C against cover 23C when in the storage position. Notably, arcuate wall 58C is not covered by panels 28C or 29C and thus one of the cupholders remains available for use when cover 23C is in the inverted closed position even though panels 28C and 29C are in the storage position. Also, it is noted that panel 28C includes a flat surface 82C useful for supporting a writing pad when in the storage position when cover 23C is in the inverted closed position. From the foregoing description, it will be readily appreciated by those skilled in the art that modifications may be made to the invention without departing from the concepts disclosed herein. Such modifications are to be considered as covered by the appended claims, unless these claims by their language expressly state otherwise.

The embodiments of the invention in which an exclusive property or privilege is claimed are defined as follows:

1. An armrest for a vehicle comprising:

a base configured for connection to a vehicle, said base defining an upper surface;

a cover shaped to overlay said upper surface, said cover having a first side for comfortably supporting a person's arm and a second side defining a depression;

a pair of spaced links operably connecting said cover to said base for movement between an armrest-defining position where said first side is exposed for use, a raised position where said cover can be inverted relative to said base, and an inverted use position on said base for exposing said depression for use; and at least one panel pivotally attached to one of said base and said cover, said at least one panel being movable between a storage position under said cover and an extended use position where said panel extends laterally from said base and said cover, said at least one panel including hook-and-loop material for securing the at least one panel in one of the storage position and the use position.

2. An armrest as defined in claim 1 wherein each of said spaced links are pivotally connected to said base and also pivotally connected to said cover.

3. An armrest as defined in claim 2 wherein each of said spaced links includes first and second ends, said first ends being pivotally connected to said base and said second ends being pivotally connected to said cover.

4. An armrest as defined in claim 3 wherein said first ends are pivotally connected to a rear end of said base, and said second ends are pivotally connected to a middle portion of said cover.

5. An armrest as defined in claim 4 wherein said pair of spaced links define first and second axes of rotation that extend along parallel directions, said first axis extending through said base and said second axis extending through said cover.

6. An armrest as defined in claim 1 wherein said base defines a compartment, said cover being configured to close said compartment when in said armrest-defining position and when in said inverted use position.

7. An armrest as defined in claim 1 wherein said first side of said cover includes a cushion and an aesthetic sheet material covering said cushion, and said second side of said cover includes a molded structure forming a plurality of sub-compartments including said depression.

8. An armrest as defined in claim 1 wherein said depression on said second side defines a cupholder.

9. An armrest as defined in claim 8 including a second cupholder defined on said second side.

10. An armrest as defined in claim 8 wherein said second side of said cover further defines a plurality of sub-compartments.

11. An armrest as defined in claim 1 including a hinge bracket for pivotally attaching said base to a vehicle.

12. An armrest as defined in claim 1 including a second panel movably mounted to one of said base and said cover for movement in opposing relationship to said first panel.

13. An armrest as defined in claim 1 wherein said panel is pivotally attached to said base.

14. An armrest as defined in claim 1 wherein said panel is attached to said cover.

15. An armrest as defined in claim 1 wherein said panel, when in said extended use position, defines an angle with said cover so that items placed on said panel will naturally nest against the cover.

16. An armrest for a vehicle comprising:

a base adapted for attachment to a vehicle, said base including walls defining a compartment, said walls including edges defining an opening to the compartment;

a reversible cover configured to mateably engage said walls to close the opening when in a first closed position and also when in an inverted second closed position, said cover including opposing first and second sides, said first side being configured to comfortably support a person's arm when said cover is in said first closed position and said second side defining a container holder aperture for use when said cover is in said inverted second closed position:

a panel positionable in a use position on the base and a storage position in the compartment; and means including hook-and-loop material for holding the panel in at least one of the use position and the storage position.

17. An armrest as defined in claim 16 wherein said first side includes a cushion and a sheet of material aesthetically covering said cushion, and said second side is defined by a molded structure that can be readily cleaned.

18. An armrest as defined in claim 16 including a linkage operably supporting said cover on said base for movement between said first closed position where said first side is exposed for use, a raised position wherein said cover can be inverted relative to said base, and said inverted second closed position on said base for exposing said aperture for use.

19. An armrest as defined in claim 18 wherein said linkage includes a pair of spaced links that are pivotally connected to said base and also pivotally connected to said cover.

20. An armrest as defined in claim 16 including a second container holder aperture defined in said second side.

21. An article for vehicles comprising:

an elongated base configured for connection to a vehicle between a pair of seats in the vehicle, said base including sidewalls and front and rear end walls defining a compartment and an opening to said compartment;

a cover shaped to mateably engage said sidewalls and said end walls to close said opening, said cover being pivotally connected to said base for movement between a closed position and an open position;

a first panel movably connected to one of said base and said cover, said first panel being operably supported for movement between a storage position wherein said first panel is located in said compartment and an extended use position wherein said first panel extends laterally from one of said sidewalls, said first panel including a relatively flat surface configured to support items adjacent said one sidewall over an edge of one of the seats when in said extended use position;

a second panel pivotally attached to one of said base and said cover for movement in opposing relationship to said first panel; and a patch of hook-and-loop material on said first panel and a mating patch of hook-and-loop material on said second panel, said patches being positioned to releasably engage when said first and second panels are in said storage positions.

22. An article as defined in claim 21 wherein said first panel is pivotally secured to said base and is configured to pivotally move from a position in said compartment adjacent one of said sidewalls to said extended use position.

23. An article as defined in claim 21 wherein said first panel is pivotally secured to said cover.

24. An article as defined in claim 21 wherein said first panel, when in said extended use position, is oriented at an angle relative to said cover so that items placed on said first panel will nest against the cover.

25. An article as defined in claim 21 wherein said cover includes first and second sides, and including a linkage pivotally connected to said cover and pivotally connected to said base for operably attaching said cover to said base for movement between the first-mentioned closed position where said first side is exposed for use, a raised position for inverting said cover and a second closed position where said second side is exposed for use, said cover closing said opening to said compartment when in said first-mentioned and second closed positions.

26. A method comprising steps of:

providing an armrest adapted for attachment to a vehicle between a pair of vehicle seats including a base defining a compartment, a cover for engaging said base and closing said compartment, and a linkage having a first end pivotally connected to said base and a second end pivotally connected to said cover, said first and second ends defining first and second parallel axes of rotation, respectively;

pivoting said cover about said first axis from a first closed position on said base to a first open position;

rotating said cover about said second axis to an inverted open position; and pivoting said cover about said first axis from said inverted open position to an inverted closed position on said base.

27. An armrest for a vehicle comprising:

a base configured for connection to a vehicle, said base defining an upper marginal surface;

a cover shaped to overlay said upper surface, said cover having a first side for comfortably supporting a person's arm and a second side defining a depression; and a pair of spaced links operably connecting said cover to said base for movement between an armrest-defining position where said first side is exposed for use, a raised position where said cover can be inverted relative to said base, and an inverted use position on said base for exposing said depression for use, said cover being configured to engage said upper marginal surface and cover said base both when in said armrest defining position and also when in said inverted use position.

* * * * *